United States Patent [19]
Hedrich

[11] 3,929,449
[45] Dec. 30, 1975

[54] METHOD OF ALLEVIATING DERMAL TOXICITY OF PESTICIDE COMPOSITIONS

[75] Inventor: Loren W. Hedrich, Overland Park, Kans.

[73] Assignee:. Gulf Oil Corporation, Pittsburgh, Pa.

[22] Filed: Dec. 10, 1973

[21] Appl. No.: 423,383

[52] U.S. Cl. .............................. 71/82; 71/65; 71/79; 71/94; 424/10; 424/68; 424/225; 424/278; 424/285
[51] Int. Cl.² ...................................... A01N 13/00
[58] Field of Search ....... 71/94, 82, DIG. 1; 424/68, 424/10

[56] References Cited
UNITED STATES PATENTS
3,737,299   6/1973   Hedrich .................................. 71/94

FOREIGN PATENTS OR APPLICATIONS
783,580   6/1972   Belgium .................................. 71/94
630,023   10/1949   United Kingdom .............. 71/DIG. 1
771,205   3/1957   United Kingdom .............. 71/DIG. 1

OTHER PUBLICATIONS
"The Pharm. Basis of Therapeutics" 3rd Ed. N.Y. MacMillan Co. p. 981 (1965).

Primary Examiner—Glennon H. Hollrah

[57] ABSTRACT

The dermal toxicity of formulations of highly toxic economic poisons which are applied by spraying, such as insecticides and herbicides, or spray concentrates or other toxic liquids which may be accidentally spilled on the skin is substantially alleviated by incorporating in the compositions effective amounts of astringent substances.

2 Claims, No Drawings

METHOD OF ALLEVIATING DERMAL TOXICITY OF PESTICIDE COMPOSITIONS

DESCRIPTION OF THE INVENTION

The toxicity of chemical substances is conventionally expressed as the number of milligrams of toxic substance per kilogram of body weight of the test animals which is lethal to 50 percent of the animals in the test. The abbreviation for this measure of toxicity is $LD_{50}$. Separate $LD_{50}$ determinations are made for oral toxicity, inhalation toxicity and dermal toxicity and often several different species of animals are employed in various tests. The toxicology of all herbicides, fungicides, insecticides and other economic poisons is investigated thoroughly and these products are classified according to toxicity and labeled accordingly. A value of less than 200 mg./kg. for acute dermal $LD_{50}$ is regarded as indicating particularly high toxicity, requiring the greatest caution in handling and use. An effort is usually made to dilute highly toxic products in some way in commercial formulations, so as to minimize the hazards involved in handling and use. However, it is impractical to dilute some substances so as to raise the $LD_{50}$ of the formulated product to a reasonably safe level. There is a need for other techniques for alleviating the dermal toxicity of highly toxic substances.

I have discovered a method of alleviating the dermal toxicity of compositions containing highly toxic substances, including those having acute dermal $LD_{50}$ ratings of less than 200, which comprises incorporating into said compositions effective amounts of certain chemicals, often used pharmaceutically as astringents, which have the ability to precipitate protein in the surface layers of the skin. Examples of such substances are certain non-toxic salts of aluminum, lead, zinc, iron, bismuth and certain other salts that contain these metals, for instance, permanganates. Other agents which have the ability to precipitate protein fractions in the skin are tannins and related polyphenolic compounds as well as acids, alcohols, or phenols in the proper concentration. Strongly hypertonic solutions, as well, possess this characteristic. Specific compounds which fall within this classification include the following: ammonium aluminum sulfate (ammonium alum), potassium aluminum sulfate (potassium alum), sodium aluminum sulfate (soda alum), aluminum sulfate (concentrated alum), aluminum subacetate, aluminum acetate, aluminum chloride, basic aluminum chloride, (aluminum hydroxychloride), zinc oxide, zinc chloride, ferric oxide, ferric chloride, gallotannic acid, various naturally occuring tannins, acetyltannic acid, aluminum citrate, bismuth subgallate, cupric citrate, gallic acid, zinc acetate, zinc oleate, zinc phosphate, zirconium carbonate, aluminum chlorate, aluminum nitrate, basic aluminum salicylate, aluminum tartrate, zinc sulfate, zinc tannate, bismuth oxide, bismuth oxycarbonate, bismuth 2, 4, 6-tribromophenoxide, basic ferric sulfate, ferrous sulfate and zinc phenolsulfonate. While the preceding list is by no means complete, it serves to illustrate some of the types of compounds possessing this quality. For the purposes of this discussion all of the effective compounds are classified as astringent substances even though they may never have been used in pharmaceutical or cosmetic compositions for their astringent properties.

By way of illustration, during the course of toxicological studies on a herbicidal compound, 1-methyl-4-phenylpyridinium chloride, it became apparent that this chemical possesses considerable dermal toxicity in rabbits. The acute dermal $LD_{50}$ in rabbits of the undiluted solid is 23.7 mg/kg. The corresponding values in rats and monkeys are 2025 mg/kg and >3038 mg/kg, respectively. The dermal $LD_{50}$ in rabbits of an aqueous formulation containing 36% w/w of 1-methyl-4-phenyl-pyridinium chloride, and 18% w/w of Tween 20 surfactant is approximately 50 mg/kg. The dermal $LD_{50}$ of a 36% aqueous solution is approximately 165 mg/kg. This toxicity is reduced substantially by the addition of an astringent substance. The following toxicological data illustrate this effect:

1. A solid mixture consisting of equal parts by weight of 1-methyl-4-phenylpridinium chloride and aluminum potassium sulfate (analyzed 47 percent 1-methyl-4-phenylpyridinium chloride) exhibited no dermal toxicity in rabbits at levels up to about 425 mg/kg.
2. An aqueous solution of 1-methyl-4-phenyl-pyridinum chloride (29.5 percent) with 5 percent aluminum sulfate has very low dermal toxicity to rabbits. ($LD_{50}$ >1350 mg/kg).
3. An aqueous solution of 1-methyl-4-phenyl-pyridinum chloride (35.2 percent) 5 percent aluminum sulfate with 0.1 percent Roccal MC-14 surfactant is safe on rabbits at 285 mg/kg.
4. An aqueous solution of 1-methyl-4-phenyl-pyridinium chloride (38.5 percent), 5 percent ferric sulfate is safe on rabbits at 260 mg/kg.
5. An aqueous solution of 1-methyl-4-phenyl-pyridinium chloride (36.1 percent), 10 percent aluminum sulfate and 9 percent Tween 20 surfactant has an acute dermal $LD_{50}$ of about 275 mg/kg on rabbits.
6. An aqueous solution of 1-methyl-4-phenyl-pyridinium chloride (36.4 percent), 5 percent aluminum sulfate and 9 percent Tween 20 surfactant has an $LD_{50}$ of about 275 mg/kg on rabbits.
7. An aqueous solution of 1-methyl-4-phenyl-pyridinium chloride (36.0 percent), 1 percent benzalkonium chloride surfactant and 5 percent aluminum sulfate has an $LD_{50}$ of about 275 mg/kg on rabbits.

The method of the invention is illustrated more specifically and in greater detail in the following discussion.

PROCEDURE

Male albino rabbits weighing 1–2 kg were used. Areas about 2 in. × 2 in. at the shoulder blades were clipped with OSTER small animal clipper, size 15. Compounds were applied 24 hours later. When liquid compounds were used, rabbits were clipped to about ⅛ in. from the skin.

The compound was held on the rabbits by Johnson and Johnson's Montgomery straps (DERMACEL). To insure that the rabbits did not ingest any of the compound while grooming themselves, another layer of non-porous cellophane was wrapped around the animal.

Compounds were left on the rabbits for 24 hours. Then they were washed off and the surviving animals kept for 10 days of further observation.

Results are summarized in the following table.

TABLE I

TEST RESULTS
DOSES CALCULATED BASED ON CONTENT OF
1-METHYL-4-PHENYLPYRIDINIUM CHLORIDE

| 1-Methyl-4-phenylpyridinium Chloride plus Vehicles: | Dose | No. dead / No. used | Time of death after application |
|---|---|---|---|
| Al-K-SO$_4$ (469 mg/gm) | 100 mg/kg | 0/4 | |
|  | 200 mg/kg | 0/4 | |
| sat. MgSO$_4$ (181 mg/ml) | 100 mg/kg | 2/8 | 6–8 days |
| sat. Al$_2$ (SO$_4$)$_3$ (294 mg/ml) | 100 mg/kg | 1/4 | 10 days |
| *5% Al$_2$ (SO$_4$)$_3$ (295 mg/ml) | 400 mg/kg | 0/8 | |
| *5% Al$_2$ (SO$_4$)$_3$ (353 mg/gm) | 400 mg/kg | 0/8 | |
| 5% Al$_2$ (SO$_4$)$_3$, 9% TWEEN 20 (364 mg/gm) | 100 mg/kg | 2/4 | 20 hours |
| 10% Al$_2$ (SO$_4$)$_3$, 9% TWEEN 20 (361 mg/gm) | 100 mg/kg | 2/4 | 20 hours |
| 5% Al$_2$ (SO$_4$)$_3$, 1% Zephiran (360 mg/gm) | 100 mg/kg | 2/4 | 20 hours |
| 5% Al$_2$ (SO$_4$)$_3$, 1:1000 Roccal MC-14 (352 mg/gm) | 100 mg/kg | 0/4 | |
| *6.9% Al$_2$ (SO$_4$)$_3$, 6.2% TWEEN 20 (248 mg/gm) | 300 mg/kg | 1/4 | 8 days |
| *2.5% Fe$_2$ (SO$_4$)$_3$ (360mg/gm) | 100 mg/kg | 0/4 | |
| *Urea, TWEEN 20 (488 mg/gm) | 100 mg/kg | 1/4 | 2 days |
| *Urea, TWEEN 20, Al$_2$(SO$_4$)$_3$ (450 mg/gm) | 100 mg/kg | 0.4 | |
|  | 200 mg/kg | 0/4 | |
| *1% ZnSO$_4$ (363 mg/gm) | 100 mg/kg | 1/4 | 24 hours |
| *Na$_2$SO$_4$ (470 mg/ml) | 100 mg/kg | 0/4 | |
| *Urea (488 mg/gm) | 100 mg/kg | 0/4 | |
| *No. 8 Water adjusted (364.7 mg/ml) pH 2.96 w/H$_2$SO$_4$ | 100 mg/kg | 2/4 | 12–18 hours |
| *No. 13 H$_2$O Sat. sodium (360.4 mg/ml) p-hydroxy benzenesulfonate | 100 mg/kg | 0/4 | |

*rabbits were shaved

Most pesticides are marketed as water-dispersible concentrates in the form of powders, pastes or liquids.

Most cases of accidental poisoning of humans or animals result from accidental contact with either the dispersible concentrates or with the aqueous spray mixtures. So that the tests would be realistic, the compositions which were tested were formulated with commercially available wetting, dispersing and emulsifying surfactants in the normal manner. Rabbits were chosen as test animals because they have thin, sensitive skins and they were made even more sensitive by clipping or shaving off the hair in the test area. By the use of these sensitive test animals, differences in acute dermal toxicity levels become clearly apparent.

In formulating water-dispersible compositions containing highly toxic pesticides it should be kept in mind that some surfactants such as wetting and penetrating agents have a tendency to increase the severity of exposure when there is accidental contact with the skin, working in direct opposition to the astringent substances, which tend to close the pores in the skin and reduce penetration. It is advisable to select the surfactants with care, using no more than necessary in the fomulations, choosing a type and amount of astringent which will afford the necessary protection. The quaternary pyridinium herbicide with which the invention is illustrated in the preceding discussion is considered to present a particularly severe problem because the toxic substance itself possesses wetting and penetrating properties. However, the method of this invention is not limited to use with pesticides which belong to this class of compounds. So far as is presently known, the effect of the astringent substance is a localized action on the skin, with no indication that interaction with the toxic substance is a factor in alleviating toxicity. The chemical nature of the toxic substance is not of critical importance to the successful use of the method. The use of the method of this invention to alleviate the toxicity of other substances is illustrated in the discussion which follows:

INVESTIGATIONAL PROCEDURE

Yound adult albino rabbits of the New Zealand strain were used as test animals. All rabbits had been maintained under observation in the laboratory for at least seven days prior to testing. During the pretest period, the animals were examined with respect to their general health and suitability as test animals. The rabbits were housed individually in suspended, wirebottomed cages and maintained on a standard laboratory ration. Food and water were offered ad libitum.

Twenty-four hours prior to the dermal applications, the backs of the rabbits were shaved free of hair with electric clippers. The shaved area on each animal constitued about 30 percent of the total body surface area. The animals were then returned to their cages to await testing on the following day. The 24-hour waiting period allowed recovery of the stratum corneum from the disturbance which accompanied the closeclipping procedure and permitted healing of any microscopic abrasions possibly produced during the process.

Each test material was applied to the backs of two rabbits, one by wrapping the trunk of the animal with impervious plastic sheeting, which was securely taped in place. This plastic wrap insured close contact of the epidermis and test material. To prevent oral ingestion of the test material, each animal was fitted with a lightweight, flexible plastic collar which was worn throughout the observation period.

The test material remained in contact with the skin for 24 hours. At the end of this period, the plastic sheeting and all residual test material were removed. The test sites were examined for local skin reactions and the animals were returned to their cages. Observations for mortality, local skin reactions, and behavioral abnormalities were continued for a total of 14 days following the skin applications. Initial and final body weights were recorded. A necropsy was conducted on all animals which died during the study as well as on all animals sacrificed at the end of the observation period.

At the end of the observation period, the acute dermal median lethal dose ($LD_{50}$) was determined. The following compositions were prepared and tested:

| Sample designation | Composition | | Published $LD_{50}$ |
|---|---|---|---|
| EN-1 | Endrin (95%) | all | 60–120 |
| EN-2 | Endrin (95%) | 10.53g. | |
| | $Al_2(SO_4)_3 \cdot 18H_2O$ | 9.47g. | |
| FR-1 | Carbofuran (97.5%) | all | 120 |
| FR-2 | Carbofuran (99%) | 9.63g. | |
| | $Al_2(SO_4)_3 \cdot 18H_2O$ | 9.90g. | |
| AZ-1 | Monocrotophos (78%) | 10.26g. | 354 |
| | Abs. $C_2H_5OH$ | 29.74g. | |
| AZ-2 | Monocrotophos (78%) | 10.26g. | |
| | Tannic acid | 5.00g. | |
| | Abs. $C_2H_5OH$ | 24.74 | |

Results

Mortality and Body Weight data are presented in Table 2.

Some variations from published $LD_{50}$ values for specific pesticides are apparent in the tabulated results. This is to be expected because published toxicity data are usually obtained with the most sensitive species of test animal and the most sensitive known procedure for that particular toxicant. The tabulated results of the comparative tests indicate alleviation of dermal toxicity by astringent substances in all instances, however. The choice of astringent substance, although rather broad, will be limited in commercial use by economic factors. Aluminum sulfate and the common alums are preferred because of their low cost. Where solubility in organic solvents is required, tannic acid will usually be the cheapest and most convenient astringent.

I claim:

1. The method of alleviating the dermal toxicity of a composition containing 1-methyl-4-phenylpyridinium chloride which comprises incorporating into said composition an effective amount of an astringent substance selected from the group consisting of aluminum sulfate, aluminum potassium sulfate and tannic acid.

2. The method of alleviating the dermal toxicity of a composition containing 1-methyl-4-phenylpyridinium chloride which comprises incorporating into said composition an effective amount of aluminum sulfate.

* * * * *

TABLE 2

TEST MATERIAL: Six Samples
Acute Dermal Toxicity Study — Albino Rabbits
Mortality and Body Weight Data

| Test Material | Dose (mg/kg) | Animal Number and Sex | Individual Body Weights (kg) Test Day Number: | | Number Dead | Percent Dead | Acute Dermal $LD_{50}$ |
|---|---|---|---|---|---|---|---|
| | | | 0 | 14 | Number Tested | | |
| EN-1* | 253 | 1-M** | 2.44 | (12 days) | 1/2 | 50 | Approx. 253 mg/kg |
| | 253 | 2-F | 2.26 | 2.42 | | | |
| EN-2* | 480 | 1-M** | 2.34 | 2.22 | 0/2 | 0 | >480 mg/kg |
| | 480 | 2-F | 2.50 | 2.78 | | | |
| FR-1* | 1,820 | 1-M** | 2.04 | 2.30 | 0/2 | 0 | >1,820 mg/kg |
| | 1,820 | 2-F | 2.28 | 2.88 | | | |
| FR-2* | 3,630 | 1-M** | 2.12 | 2.40 | 0.2 | 0 | >3,630 mg/kg |
| | 3,630 | 2-F | 2.28 | 2.60 | | | |
| AZ-1 | 3,540 | 1-M** | 2.16 | 2.44 | 1/2 | 50 | Approx. 3,540 mg/kg |
| | 3,540 | 2-F | 2.36 | (6–22 hr.) | | | |
| AZ-2 | 3,540 | 1-M** | 2.36 | 2.48 | 0/2 | 0 | >3,540 mg/kg |
| | 3,540 | 2-F | 2.22 | 1.44 | | | |

Note:
Figures in parentheses indicate time of death.
*The test material was applied to skin premoistened with tap water.
**Abraded skin.